March 18, 1924.
F. KURGAN
PEN AND PENCIL CASE
Filed Oct. 19, 1922
1,487,580
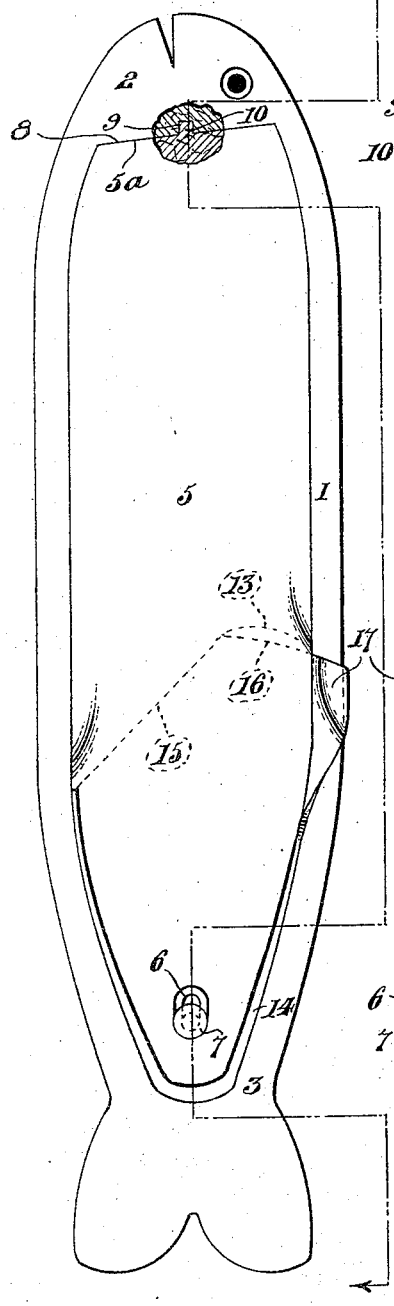
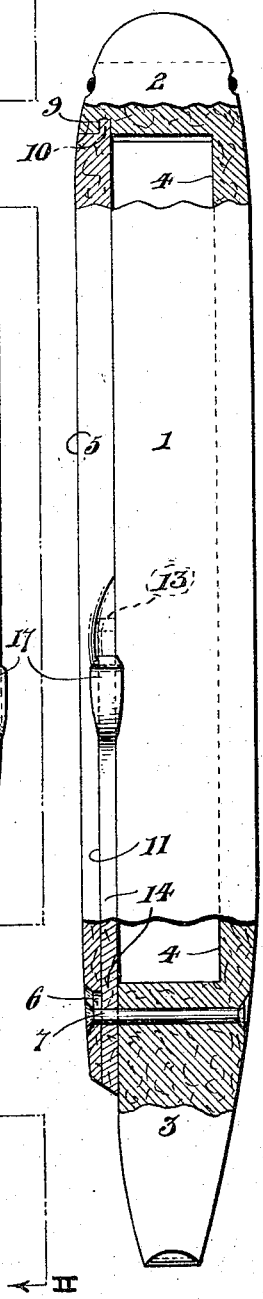
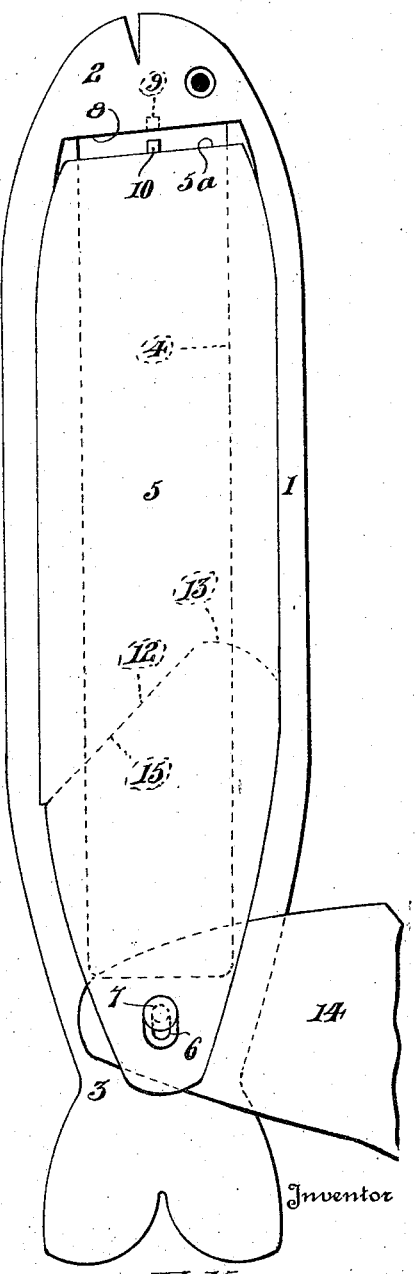
Inventor
F. Kurgan
By
Attorney.

Patented Mar. 18, 1924.

1,487,580

UNITED STATES PATENT OFFICE.

FRANK KURGAN, OF HOLYOKE, MASSACHUSETTS.

PEN AND PENCIL CASE.

Application filed October 19, 1922. Serial No. 595,567.

*To all whom it may concern:*

Be it known that I, FRANK KURGAN, a citizen of the United States of America, residing at Holyoke, in the county of Hampden and State of Massachusetts, have invented certain new and useful Improvements in Pen and Pencil Cases, of which the following is a specification.

This invention relates to certain new and useful improvements in pen and pencil cases wherein the external configuration thereof is in the form of a fish having a receptacle or pocket in the body portion with a swingingly mounted side wall or cover for the receptacle carried by the body.

A further object of the invention is to provide a pen and pencil case of the type above set forth wherein the swingingly mounted cover for the receptacle is also slidably associated therewith and has an interlocking connection with the body, the cover being maintained in its closed and locked position by a hinged lever associated with the cover and the pivotal mounting therefor.

With the above and other objects in view, the invention consists of the novel form, combination and arrangement of parts hereinafter more fully described, shown in the accompanying drawing and claimed.

In the drawing, wherein like reference characters designate corresponding parts throughout the several views, Figure 1 is a side elevational view, partly in section of a pen and pencil case constructed in accordance with the present invention, the external configuration thereof being in simulation of a fish, and showing the cover for the receptacle of the fish in its closed position and interlocked with the body of the case, Figure 2 is a longitudinal sectional view taken on line II—II of Fig. 1 showing the pivotal mounting for the case cover and the slot in the cover permitting limited sliding movement thereof for disconnecting the engaging parts between the cover and the case, and Figure 3 is a side elevational view of the device, similar to Fig. 1 showing the locking lever for the case cover moved on its pivotal mounting with the cover slid to its releasing position prior to swinging movement.

Referring more in detail to the accompanying drawing, the pen and pencil case disclosed therein has the external configuration thereof representing a fish embodying a body portion 1, a head 2 and a tail portion 3. The body portion 1 of the fish is provided with a compartment or receptacle 4 to contain pens, pencils or the like, the receptacle opening at one side of the body as clearly shown in Figs. 2 and 3, the open side thereof being closed by the cover 5.

The cover 5 constitutes one side of the body of the fish and has a slot 6 formed in one end thereof adjacent the tail portion 3 of the body through which the pin 7 extending through the tail portion of the body freely projects as shown in Fig. 2. The end of the cover 5 adjacent the head 2 of the body portion 1 is set into the body as shown in Figs. 1 and 2, said head portion 2 being provided with a shoulder 8 against which the adjacent edge 5ª of the cover is adapted to abut. The shoulder 8 is provided with a socket 9 that receives the pin 10 carried by the end wall 5ª of the cover to form an interlocking connection between the body portion 1 and the cover when the latter is moved to its completely closed position as illustrated in Figs. 1 and 2.

For holding the cover 5 in its closed and interlocked position relative to the body portion 1 of the casing, the inner face of the cover 5 adjacent the tail portion 3 of the case body is cutaway as at 11 to provide angularly disposed shoulders 12 and 13 while a lever plate 14 is pivotally mounted upon the pin 7 between the body 1 of the casing and the cover 5, the lever plate 14 being received in the cutaway portion 11 having angularly disposed ends 15 and 16 cooperating with the shoulders 12 and 13 of the cutaway portion of the cover as shown in Figs. 1 and 3, the end wall 15 abutting the shoulder 12 as illustrated to prevent sliding movement of the cover upon the body portion 1, thereby maintaining the pin 10 in the socket 9 with the cover in its locked position. A finger grip 17 projects laterally of the swinging end of the lever plate 14 and is employed for shifting the lever plate upon the pin 7.

From the above detail description of the device, it is believed that the construction and operation thereof will at once be apparent, it being noted that it is only necessary to grip the finger piece 17 upon the lever plate 14 for laterally shifting the same to space the end wall 15 thereof from the diagonal shoulder 12 forming the end wall of the cutaway portion 11, at which time the cover plate 5 may be slid longitudinally upon the body portion 1, permitted by the slotted opening 6, disengaging the interlocking connection 9—10.

While there is herein shown and described the preferred embodiment of the present invention, it is nevertheless to be understood that minor changes may be made therein without departing from the spirit and scope of the invention as claimed.

What is claimed as new is:—

In a device of the class described, a body portion having a receptacle therein, a bearing pin carried by the body portion, a cover for the receptacle having a slotted opening therein receiving the pin, a shoulder at one end of the body portion adapted to be engaged by the free end of the cover, said shoulder having a socket therein and a lug carried by the end of the cover adapted to be received in the socket, the underside of the cover having a cut-away portion adjacent its pivoted end with angularly disposed shoulders at one end of the cut-away portion, and a lever plate pivoted on the bearing pin within the cut-away portion of the cover and having angularly disposed end walls engaging the shoulders of the cut-away portion to lock the cover on the body portion against sliding movements.

In testimony whereof I affix my signature.

FRANK KURGAN.